United States Patent
Maino et al.

(10) Patent No.: US 8,856,504 B2
(45) Date of Patent: Oct. 7, 2014

(54) SECURE VIRTUAL MACHINE BOOTSTRAP IN UNTRUSTED CLOUD INFRASTRUCTURES

(75) Inventors: Fabio R. Maino, Palo Alto, CA (US); Pere Monclus, San Jose, CA (US); David A. McGrew, Poolesville, MD (US); Robert T. Bell, Bountiful, UT (US); Steven Joseph Rich, Maryville, TN (US)

(73) Assignee: Cisco Technology, Inc., San Jose, CA (US)

( * ) Notice: Subject to any disclaimer, the term of this patent is extended or adjusted under 35 U.S.C. 154(b) by 880 days.

(21) Appl. No.: 12/795,466

(22) Filed: Jun. 7, 2010

(65) Prior Publication Data

US 2011/0302400 A1   Dec. 8, 2011

(51) Int. Cl.
G06F 12/14 (2006.01)
G06F 9/24 (2006.01)

(52) U.S. Cl.
USPC ............ 713/2; 713/189; 713/171; 713/190; 713/194; 380/37; 380/255; 380/251; 380/28; 380/286

(58) Field of Classification Search
USPC .................... 713/2, 190; 726/26, 27
See application file for complete search history.

(56) References Cited

U.S. PATENT DOCUMENTS

| | | | |
|---|---|---|---|
| 6,098,056 A | 8/2000 | Rusnak et al. | |
| 2004/0093505 A1* | 5/2004 | Hatakeyama et al. | 713/189 |
| 2005/0100163 A1* | 5/2005 | Buer | 380/259 |
| 2005/0105738 A1* | 5/2005 | Hashimoto | 380/277 |
| 2008/0059556 A1* | 3/2008 | Greenspan et al. | 709/201 |
| 2009/0240953 A1* | 9/2009 | Paul | 713/193 |
| 2009/0259855 A1 | 10/2009 | De Cesare | |
| 2009/0290712 A1 | 11/2009 | Henry | |

FOREIGN PATENT DOCUMENTS

EP  1536308 A2  6/2005

OTHER PUBLICATIONS http://book.huihoo.com/pdf/security-engineering/Papers/fibonacci.pdf "On Fibonacci Keystream Generators" Ross Anderson May 2010.*
http://www.cosic.esat.kuleuven.be/publications/article-40.pdf "A New Weakness in the RC4 Keystream Generator"—Bart Preneel, Nov. 2006.*
International Search Report and Written Opinion for PCT/US2011/039246 dated Oct. 14, 2011.

* cited by examiner

Primary Examiner — Randy Scott
(74) Attorney, Agent, or Firm — Patterson & Sheridan LLP

(57) ABSTRACT

Techniques are described for securely booting and executing a virtual machine (VM) image in an untrusted cloud infrastructure. A multi-core processor may be configured with additional hardware components—referred to as a trust anchor. The trust anchor may be provisioned with a private/public key pair, which allows the multi-core CPU to authenticate itself as being able to securely boot and execute a virtual machine (VM) image in an untrusted cloud infrastructure.

19 Claims, 12 Drawing Sheets

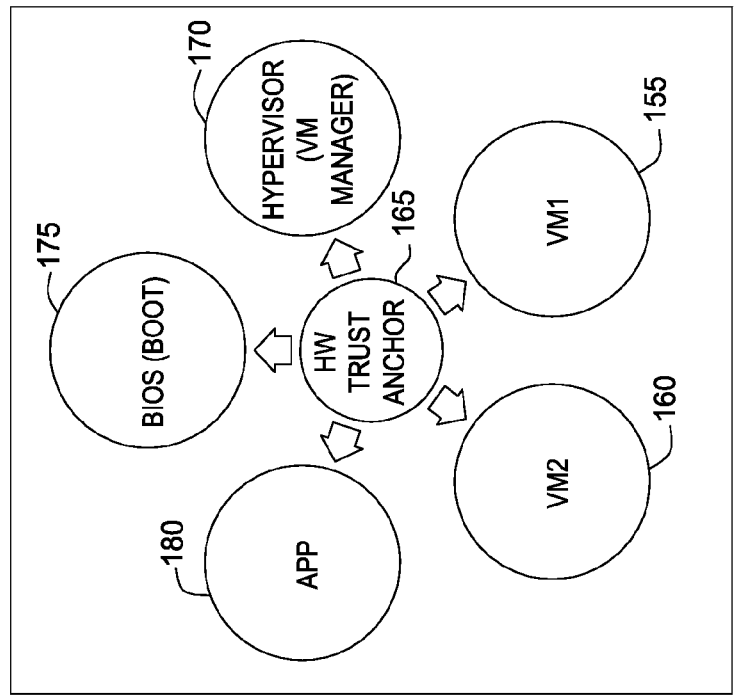
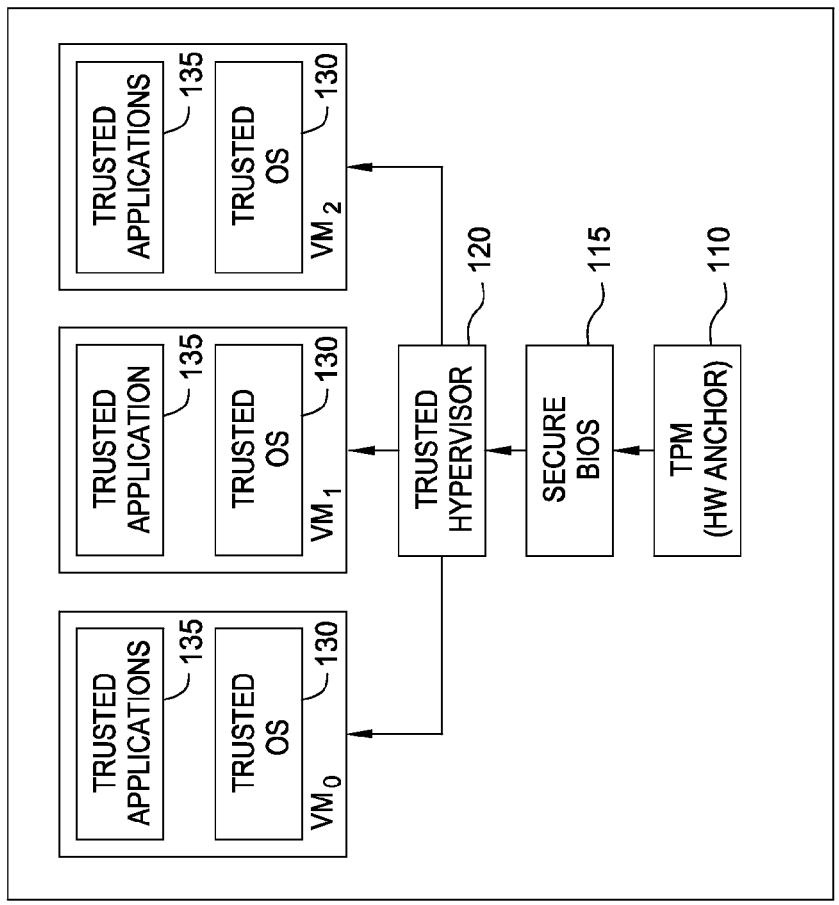
FIG. 1B
FIG. 1A

SECURE VIRTUAL MACHINE BOOTSTRAP IN UNTRUSTED CLOUD INFRASTRUCTURES

TECHNICAL FIELD

Embodiments presented in this disclosure generally relate to techniques for providing a computing infrastructure for a virtualization server, and more particularly, to a method and apparatus for securely booting a virtual machine (VM) in an untrusted cloud infrastructure.

BACKGROUND

Server virtualization technology allows multiple virtual machines to run concurrently on a single physical computing system. Currently, data center environments are used to create large clusters of such physical computing systems (commonly referred to as servers), where each server runs multiple virtual machines (VMs). This approach has led to data centers that can supply massive amounts of computing power. Several providers currently allow users to supply virtual machine instances to run on the virtualization servers provided by the operator of the data center. In various forms, this general model of computing has come to be referred to as "cloud computing" or "Infrastructure as a Service" (IaaS) because users simply run their virtual machine instances on an abstract hardware platform, without having to own or manage that hardware platform. This approach allows a given user to rapidly scale up dozens, if not hundreds or thousands of virtual machine instances to respond to changes in demand for computing resources.

At the same time, a significant obstacle faced by of cloud computing and IaaS providers is the need for users to trust the cloud provider and the implementation of the hypervisor (or Virtual Machine Manager, (VMM)) that manages multiple VMs running on a server. Currently this is done by audits and understanding of the operating processes that cloud providers have in place in regards to security. This leads to a sense of trust, but there is not a strong mechanism to guarantee effective separation between VMs executed in the same central processing unit (CPU) socket server.

The fact that VMs belonging to different enterprises are collocated in the same server can lead to side attacks and security concerns. For example, when VMs belonging to different enterprises are executed in distinct cores of the same CPU, they share access to memory via an L3 cache (or bypassing memory protections set by the hypervisor). In the hands of skilled individuals, this could lead to information being leaked from one VM to the other. That is, a malicious VM from one enterprise could try to gain access the memory of a VM running on behalf of another enterprise.

Another concern is the hypervisor itself. Even if the hypervisor is designed to enforce separation between distinct VMs, data could still leak from one VM to the other either for a hypervisor bug or for explicit attacks directed against the hypervisor itself. Further, another set of attacks could be launched by a malicious administrator who is part of the cloud provider personnel.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 1A-1B are block diagrams illustrating different security models for trusted execution in Infrastructure as a Service (IaaS) cloud environments, according to certain embodiments of the present disclosure.

DESCRIPTION

Overview

Figure 2:
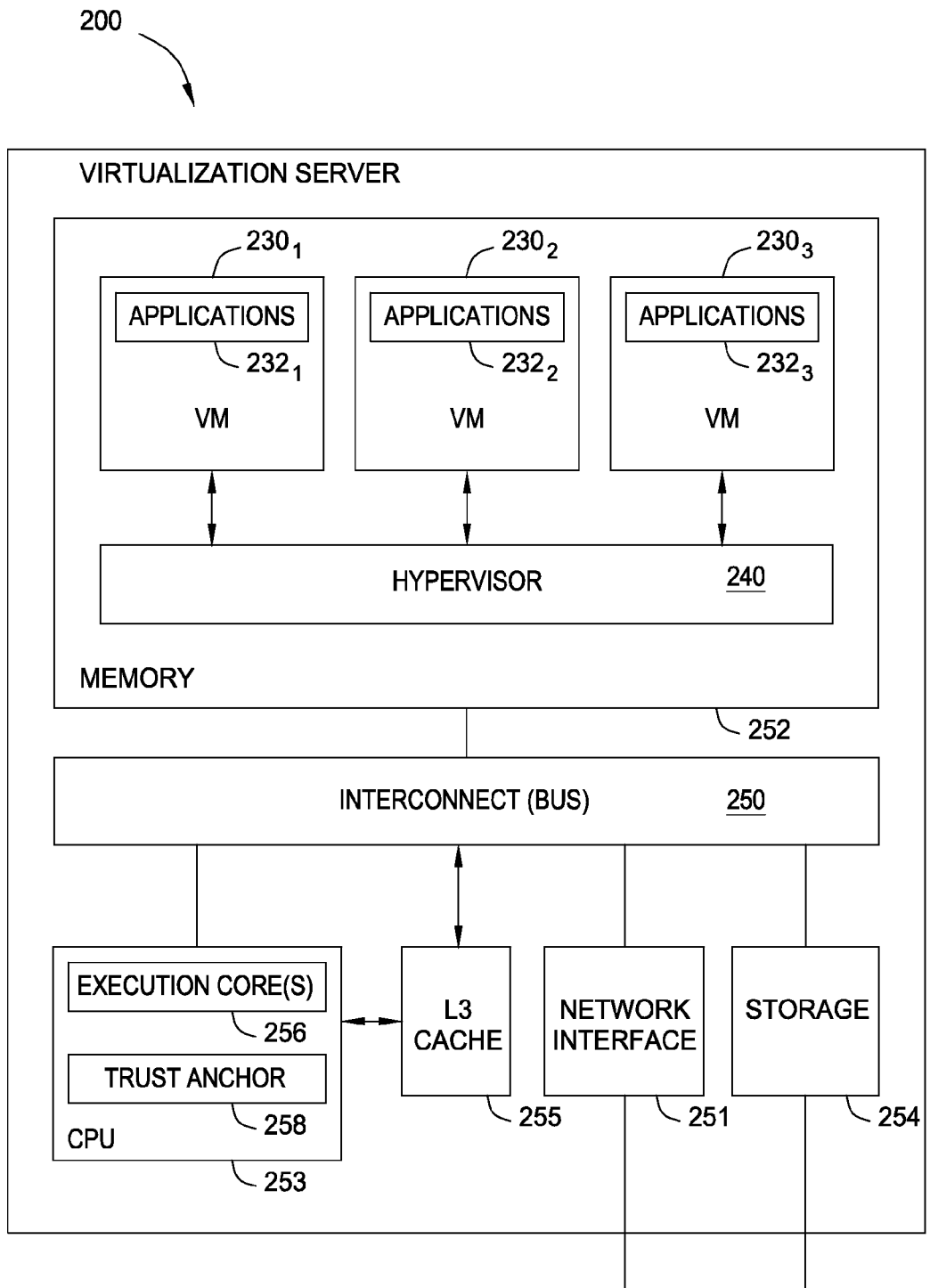
FIG. 2 is a block diagram illustrating components of a virtualization server configured to provide for the trusted execution of multiple VMs in an IaaS environment, according to certain embodiments of the present disclosure.

One embodiment described herein includes a method. The method may generally include receiving, by a trust anchor on a central processing unit (CPU) having a plurality of processing cores, a virtual machine (VM) image. As received, the VM image is encrypted using a VM image encryption key. The method may also include obtaining the VM image encryption key and configuring a first encrypt/decrypt block with the VM image encryption key. The method may also include generating a memory session key and configuring a second encrypt/decrypt block with the memory session key. The method may also include fetching one or more pages of the VM image into a memory accessible by the plurality of processing cores. Each fetched page may be decrypted by the first encrypt/decrypt block using the VM image encryption key and subsequently encrypted by the second encrypt/decrypt block using the memory session key.

In a particular embodiment, the method may also include obtaining the VM image encryption key may include signing a first encrypted copy of the VM image encryption key with a private key embedded in the trust anchor, transmitting the signed, encrypted, copy of the VM image encryption key to a key service in order to authenticate the presence of the trust anchor on the CPU and receiving, in response to the authentication, a second encrypted copy of the VM image encryption key, wherein the second encrypted copy of the VM image encryption key is encrypted using a public key of the trust anchor.

Another embodiment described herein includes a computing system. The system may include a CPU having a plurality of processing cores, a memory accessible by the plurality of processing cores, and a trust anchor. The trust anchor may generally be configured to obtain a VM image encryption key, configure a first encrypt/decrypt block with the VM image encryption key, generate a memory session key, and configure a second encrypt/decrypt block with the memory session key. The computing system may also include a memory controller configured to fetch one or more pages of the VM image into the memory. Each fetched page may be decrypted by the first encrypt/decrypt block using the VM image encryption key and subsequently encrypted by the second encrypt/decrypt block using the memory session key while being written to the memory.

Still another embodiment described herein includes a computer-readable storage medium storing code for execution by a trust anchor on a central processing unit (CPU) having a plurality of processing cores. The code when executed by the trust anchor may perform an operation. And the operation itself may generally include receiving a virtual machine (VM) image that has been encrypted using a VM image encryption key. The operation may also include obtaining the VM image encryption key, configuring a first encrypt/decrypt block with the VM image encryption key, generating a memory session key, configuring a second encrypt/decrypt block with the memory session key. Once the encrypt/decrypt blocks are configured by the trust anchor, pages of the VM image are fetched into a memory accessible by the plurality of processing cores, and wherein each fetched page is decrypted by the first encrypt/decrypt block using the VM image encryption key and subsequently encrypted by the second encrypt/decrypt block using the memory session key while being written to the memory.

Description of Example Embodiments

Embodiments described herein provide techniques for securely booting and executing a virtual machine (VM) image in an untrusted cloud infrastructure. For example, one embodiment described herein provides a computing architecture used boot and execute to a VM image. The computing architecture may be a multi-core processor with additional hardware components—referred to as a trust anchor. The trust anchor may be configured to manage the encryption keys used by the secure bootstrap process described herein.

In one embodiment, the trust anchor is embedded with the multi-core processor and may be provisioned, at manufacturing time, with a public/private key pair and a Public Key Infrastructure (PKI) certificate, which binds the trust anchor identity to the public key listed in the certificate. The CPU model and manufacturer may be listed as the attributes of this certificate. Advantageously, embedding the trust anchor within the CPU, allows an enterprise to securely bootstrap a VM without trusting any of the elements of the BIOS-loader/BIOS/OS-Loader/Hypervisor chain.

Prior to booting an encrypted VM image, the trust anchor engages in a security protocol to authenticate itself to the enterprise and obtain a VM image encryption key used to decrypt the encrypted VM image. As described in greater detail herein, the trust anchor configures a disk control block the VM image encryption key. The trust anchor also generates a memory session key used to configure an encrypt/decrypt block in cache lines between an L3 cache and memory and between the L3 cache and an L2 cache on each processing core. Once the encrypt/decrypt blocks on the CPU are configured, the VM image may be fetched from storage and booted.

As elements of the encrypted VM image are fetched from storage, the disk control block decrypts them using the VM image encryption key. The memory session key is then used to re-encrypt such elements as they are written to an L3 cache. When data for a given memory address is needed, the memory session key in the cache line between the L2 cache of a processing core and the shared L3 caches is used to decrypt data read from (and written to) the L3 cache. Thus, the data in the L3 cache (shared among multiple processing cores) remains encrypted until fetched into an L2 cache (local to a processing core).

For example, in one embodiment, the trust anchor may encrypt/decrypt data written to and read from the L3 cache using the Advanced Encryption Standard (AES) Counter Mode (AES-CTR). Using AES-CTR may provide encryption speeds sufficient to encrypt/decrypt data moving between an L2 cache on a core and the L3 cache shared among multiple processing cores within a multi-core architecture. Of course, other stream ciphers with sufficient performance characteristics may be used. More generally, any keyed pseudorandom function can be used in Counter Mode and AES is a commonly used pseudorandom function, used for concreteness in describing an embodiment. Using AES-CTR, the actual encryption may be performed by XORing plaintext as it is written to the L3 cache with a keystream generated by encrypting successive incremental values of a counter using a key associated with the execution context of a given VM (i.e., with the memory session key). In one embodiment, the counter used to generate the keystream for encrypting/decrypting L3 cache lines is composed by concatenating a memory address associated with a particular read/write operation and a nonce value.

When an exception occurs (e.g., a timer interrupt, a hardware access, etc.) the trust anchor swaps out the VM image encryption key associated with the running VM instance and selects the appropriate key for a new execution context (e.g., a key associated with another VM image or the hypervisor). In one embodiment, the CPU may be configured to signal the trust anchor with an execution context for the next VM instance (or hypervisor) scheduled for execution. For example, the virtualization extensions provided by the Intel® VT-x technology and AMD-V technology. Further, the process for switching keys and initializing an encryption engine included in the trust anchor may require fewer clock cycles than required for the context switch itself.

The following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the proposed ideas have not been described in detail.

FIGS. 1A-1B are block diagrams illustrating different models for trusted VM execution in Infrastructure as a Service (IaaS) cloud environments, according to certain embodiments of the present disclosure. As shown in FIG. 1A, a stack model 105 may be used to provide a trusted environment for executing one or more virtual machines 125. In particular, a hardware anchor chip (e.g., a Trusted Platform Module (TPM) 110), or equivalent, may be used to perform the following tasks: secure key storage, signature imposition/verification, and secure export of keys, etc. The TPM 110 forms the fist link of trust in the stack model 105. Once the TPM 110 validates it, the secure BIOS 115 may in turn validate that the hypervisor 120 has not been modified. Doing so extends the trust chain from the TPM 110 to the secure BIOS 115, and subsequently, to the hypervisor 120. Once booted, the hypervisor 120 follows the same procedure to bring up the virtual machine 125. That is, once validated by the secure BIOS 115, the hypervisor 120 acts as a trusted actor to validate and boot a virtual machine instance 125. Thereafter, the operating system 130 on each virtual machine 125 do the same to boot applications 135. More simply, TPM 110 validates the BIOS 115, which validates the hypervisor 120, which in turn validates each VM 125 booted on the hypervisor 120. Thus, the stack model 105 relies on each element in the chain trusting its predecessor.

In the stack model 105, the upper layers rely on the lower layers for trust. If there is any breakage on the chain, the system is not secure. Further, the lower layers on the chain may still have visibility to what upper layers may be executing. Further still, even when a hypervisor validates and boots a given virtual machine 125, it does not limit the actions performed by trusted OS 130 and trusted applications 135. Thus, the stack model 105 does not prevent an otherwise validated application 135 (or VM 125) from accessing data belonging to another VM executed by the hypervisor 120, e.g., data stored in a L3 cache.

Figure 3:
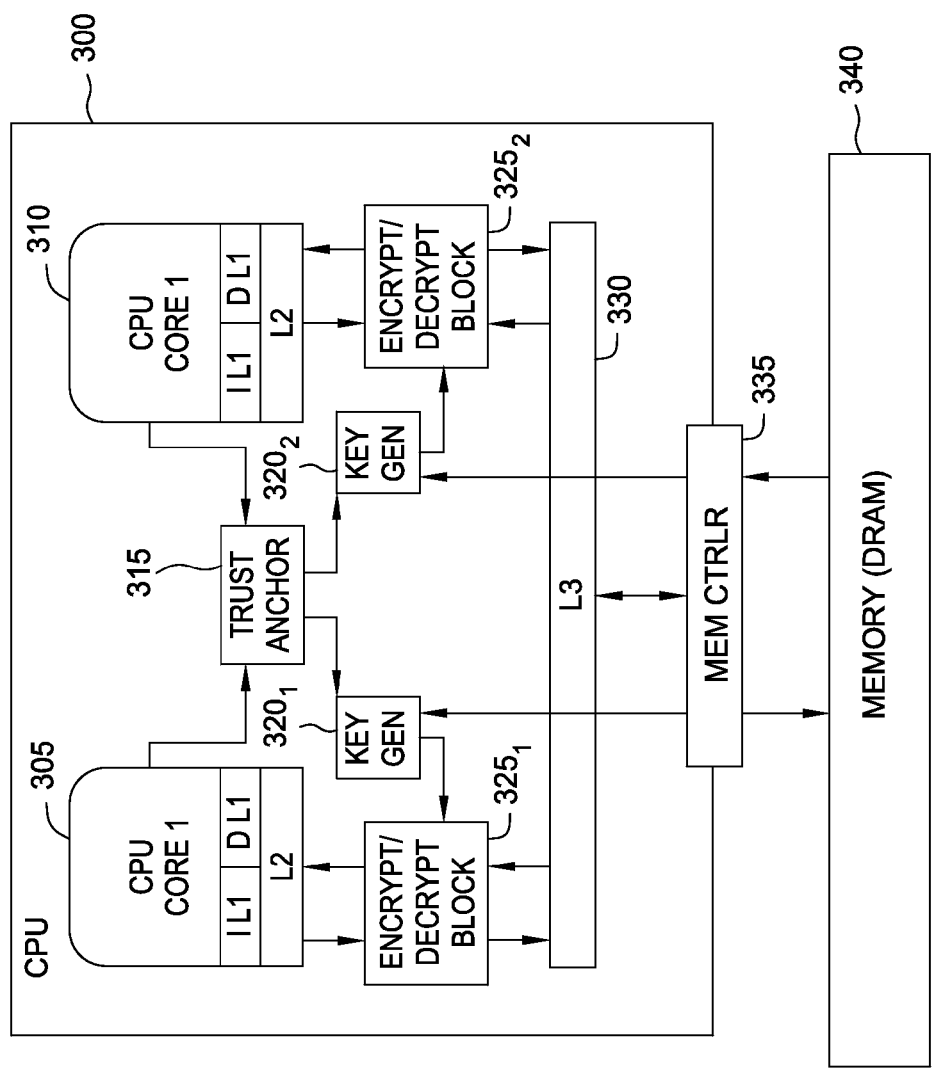
FIG. 3 is a block diagram illustrating an example of a processor architecture configured to provide for trusted virtual machine execution in an IaaS environment, according to certain embodiments of the present disclosure.
Figure 4:
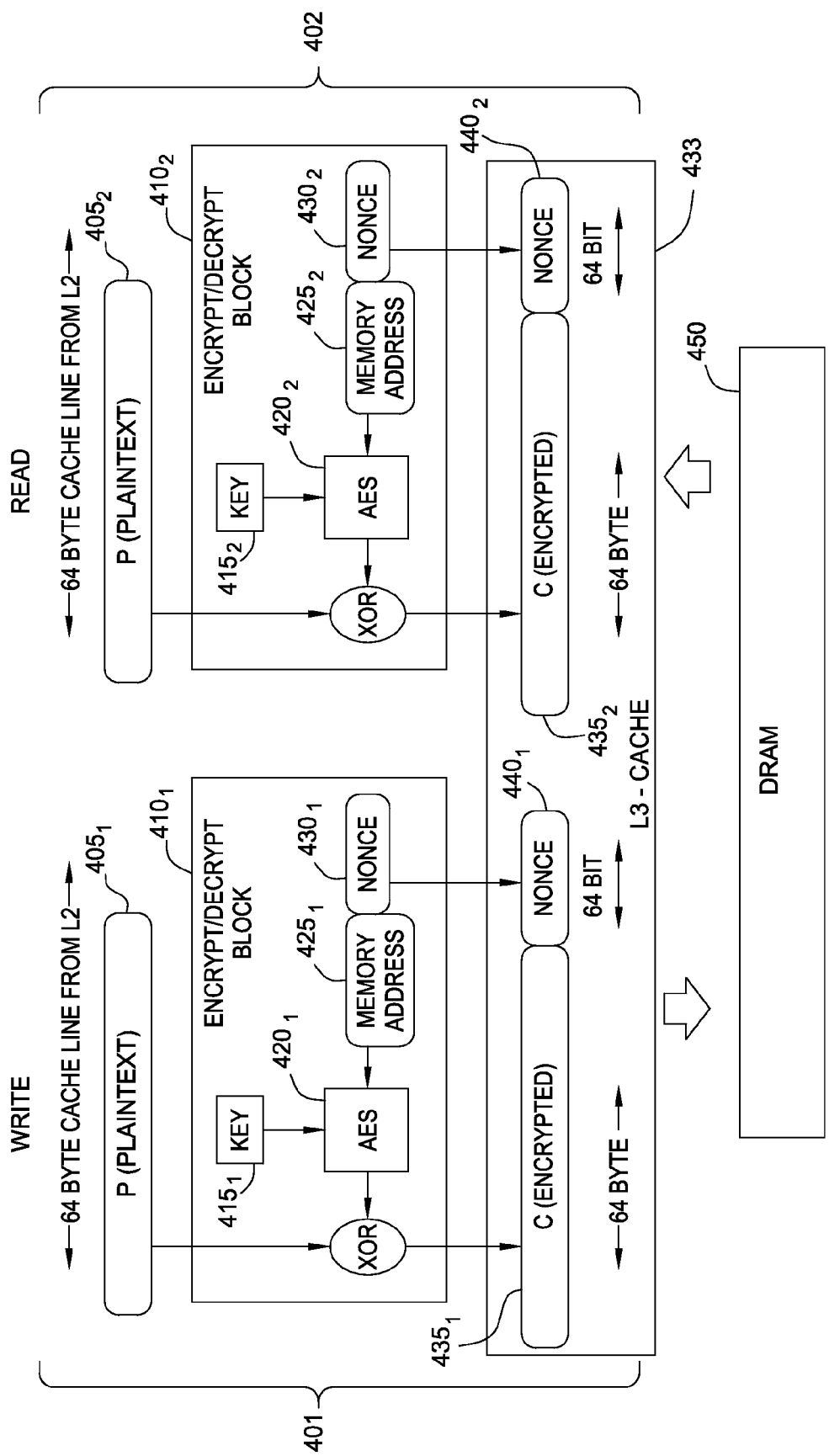
FIG. 4 further illustrates aspects of the CPU architecture first shown in FIG. 3, according to certain embodiments of the present disclosure.

FIG. 1B shows an alternative trust model, according to one embodiment presented in this disclosure. As shown, the trust model 150 provides a star model where a trust anchor 165 sits in the middle rather than at the bottom. Doing so allows the trust anchor 165 to directly validate a BIOS 175 and a hypervisor 170 on a virtualization server. But further, doing so also allows the trust anchor 165 to validate each VM image passed to the hypervisor 170 for execution (e.g., VM1 155 and VM2, 160) as well as to validate code for applications 108 to load and execute on the VMs 155,160. That is, unlike the stack model 105, the star model 150 provides a trust anchor 165 configured to provides a trust anchor 165. In order to prevent unauthorized access between execution contexts, the star model 150 shifts from integrity protection (in the stack model) to confidentiality for each relevant actor within a virtualization server. Doing so may be used to provide a secure computing environment for VMs 155, 160. For example, unlike the stack model 105, the star model 150 prevents actors with higher privileges (e.g., hypervisor 170) from accessing the data of other actors (e.g., VMs 155,160) as wells as prevents one VM from accessing data belonging to another VM, even when such VMs are executed concurrently in different cores on a multi-core processor and sharing an L3 cache and memory. FIGS. 2-4, discussed below, provide an example architecture implementing the star model 150 shown in FIG. 1B on a virtualization server with a multi-core CPU.

FIG. 2 is a block diagram illustrating components of a virtualization server 200 configured to provide for the trusted execution of multiple VMs in an IaaS environment, according to certain embodiments of the present disclosure. The virtualization server 200 may generally include a collection of hardware computing components connected by one or more interconnects 250. Illustratively, virtualization server 200 includes network interface cards (NICs) 251, a memory 252, CPU(s) 253, and a storage device 254 (e.g., a locally attached disk drive, solid-state device (SSD), or a connection to remote storage such as a SAN).

Virtualization server 200 allows multiple virtual machines (VMs) $230_{1-3}$ to execute on the server 200 concurrently, sharing the computing hardware present on the virtualization server 200. However, the virtual machines $230_{1-3}$ are not generally aware of the computing hardware on the virtualization server 200 directly. Instead, a hypervisor 240 may be configured to provide virtualized hardware elements for each virtual machine $230_{1-3}$. Note, while the virtual hardware allocations appear distinct to the OS and applications 136 running on each virtual machine $230_{1-3}$, they are shared below the virtualization layer. That is, the virtual resources provide an abstraction for the underlying physical resources—and the underlying physical resources are shared among the virtual machines $230_{1-3}$.

Illustratively, the memory 252 includes the hypervisor 240 managing three virtual machine instances (VMs) $230_{1-3}$. Each VM $230_{1-3}$ provides a virtualized computing platform with a virtual CPU, memory, storage, and networking interfaces. An operating system is booted on each VM $230_{1-3}$ and used to load and execute applications $232_{1-3}$. In one embodiment, the hypervisor 240 may be implemented as a software layer that runs directly on the computing hardware of the virtualization server 200. In such a case, the hypervisor 240 may be configured to intercept some (or all) operating system calls made by the OS running on a VM 230.

More generally, the hypervisor 240 runs over the system hardware and allows the virtualization server 200 to host the VMs $230_{1-3}$. In one embodiment, a trust anchor 258 may be used to validate the hypervisor 240. That is, the hypervisor 240 (i.e., the image of the hypervisor 240 on a storage disk) 240 may be signed by an encryption key, and the trust anchor 258 may be configured to obtain the key needed to verify that the hypervisor 240 has not been modified, prior to loading the hypervisor 240. For example, a given IaaS provider (or hypervisor vendor) may sign the hypervisor code using a private key of a private/public key pair. In some cases, the public key may also be signed by a certificate authority (and provided as part of a PKI certificate). In turn, the trust anchor 258 may obtain the public key from the PKI certificate and validate the digital signature associated with the hypervisor 240.

Once validated, the hypervisor 240 may boot and execute VMs $230_{1-3}$. Further, each VM 230 may also be a signed and/or encrypted object. For example, an enterprise may transmit a VM image encrypted using a VM image encryption key to the virtualization server 200. As described in greater detail below, in one embodiment, the trust anchor 258 authenticates itself to the enterprise in order to obtain the VM image encryption key associated with a given VM 230 prior to executing that VM 230 on the virtualization server 230. The VM image encryption key may be used to decrypt an encrypted VM image submitted to the virtualization server 200.

Further, the trust anchor 258 may obtain (or generate) a memory session for each given VM 230 and use it to encrypt/decrypt information read from and written to the cache 255 while a VM executes on one of the execution cores 256. As described in greater detail below, the trust anchor 258 may generate a memory session key as part of loading a given VM instance. The trust anchor 258 may be configured to swap memory session keys whenever the execution context on one of the execution cores 256 on CPU 253 is changed, e.g., a context-switch between different VMs $230_{1-3}$ or between a VM $230_{1-3}$ and the hypervisor 240 itself.

The cache 255 provides a high-speed memory accessed by the execution cores 256 on the CPU 253. While memory 252 can be segmented across virtual machines 230, cache 255 is often shared by different VMs $230_{1-3}$. For example, as shown, CPU 253 may include one or more execution cores 256. When distinct VMs $230_{1-3}$ are executed on different execution cores 256, the VMs $230_{1-3}$ may share access to the cache 255. In one embodiment, the trust anchor 258 may use a distinct memory session key for each VM 230 to encrypt/ decrypt each read/write to the cache 255. Doing so prevents a VM 230 executing on one execution core 256 from accessing data in the cache 255 belonging to another VM 230 executing on a different execution core 256. Further, doing so also prevents the hypervisor 240 from accessing data in the cache 255 belonging to a given VM $230_{1-3}$, despite the hypervisor 240 having a generally higher privilege level.

FIG. 3 is a block diagram illustrating an example of a processor architecture configured to provide for the trusted virtual machine execution in an IaaS environment, according to certain embodiments of the present disclosure. As shown, a CPU 300 includes two distinct processing cores 305, 310. And each CPU core 305 includes a layer 1 (L1) instruction and data cache and an L2 cache. CPU 300 also includes a trust anchor 315, and processing cores 305, 310 each have an associated key generation component $320_{1-2}$ and an encrypt/decrypt block $325_{1-2}$. Illustratively, cache lines connecting processing cores 305, 310 to a shared L3 cache 330 each include one of the encrypt/decrypt blocks $325_{1-2}$. The L3 cache 330 is connected to a memory controller 335, which in turn is connected to a memory 340.

Although CPU 300 illustrates an example embodiment with two processing cores 305, 310, one of ordinary skill in the art will recognize that the embodiments described herein can readily be adapted for a CPU having more processing cores. In such a case, each additional CPU core would include a connection to the trust anchor 315 as well as a key generation component 320 an encrypt/decrypt block connected the shared L3 cache 330.

In one embodiment, the trust anchor 315 may be configured to manage multi-tenancy execution context (i.e., the execution of multiple virtual machine images) on the processing cores 305, 310 as well as manage communications with the external world. For example, the trust anchor 315 may be configured to provide a secure boot process for loading and booting a VM instance, to provide for secure context switching between VM instances, to swap memory session keys based on execution context, and to provide for secure key storage during VM execution. In one embodiment, the trust anchor 315 embedded with the CPU 300 may be provisioned, at manufacturing time, with a public/private key pair and a certificate issued by the certificate authority (CA) that binds the trust anchor 165 identity to the public key. The CPU model and manufacturer name may be included as attributes of this certificate. As described in greater detail below, the trust anchor 315 may use the public/private key pair to prove that a virtualization server has a multi-core CPU configured with a trust anchor and, accordingly, can boot and execute a VM image in an otherwise untrusted cloud environment.

The trust anchor 315 may receive an indication from a processing core 305, 310 whenever a context switch occurs. Such an indication may provide an identifier for an incoming execution context. As noted above, certain multi-core processors provide an extended instruction set that allow for an execution context to be exported from a processing core on a CPU. For example, the virtualization extensions provided by the Intel® VT-x technology and the VMX instruction set provide instructions used to signal changes in execution context on a processing core (e.g., the VMEXIT and VMRESUME instructions).

In response to a signal from one of the cores 305, 310 indicating a change in execution context, the trust anchor 315 may configure the encrypt/decrypt block $325_{1-2}$ and key generation component $310_{1-2}$ associated with that processing core 305, 310 for the new execution context. When a context switch occurs, the trust anchor swaps out a key associated with the then current execution context on a processing core 305, 310 and replaces it with a key associated with the incoming execution context. As is known, a context switch on a multi-core processor between VM instances (or between a VM instance and the hypervisor) requires registers (e.g., status, IR, general purpose, counters) on the CPU core to be restored (or initialized) for the incoming execution context. In one embodiment, the trust anchor 315 may be configured to swap the appropriate encryption key and initialize the encrypt/decrypt block $325_{1-2}$ using fewer clock cycles than required to perform the context switch itself (currently, a process that typically requires ~20-30 clock cycles). Doing so allows the trust anchor to provide a secure execution context for the incoming VM instance (or hypervisor) without introducing any collateral latency.

Once initialized, the encrypt/decrypt block 325 encrypts/decrypts data as it is moved over cache lines between the processing core 305, 310 and the L3 cache 255. In one embodiment, the encrypt/decrypt blocks $325_{1-2}$ provide a hardware based implementation of a stream cipher. As is known, stream cipher is a symmetric key cipher where plaintext is combined with a keystream to encrypt small units of data (e.g., a single bit or byte at a time). In a particular embodiment, the encrypt/decrypt blocks may be configured to use AES-CTR (Advanced Encrypted Standard-Counter mode) as the stream cipher. Using a stream cipher allows data to be encrypted/decrypted as it moves between a processing core 305, 310 and the L3 cache 330 without requiring additional clock cycles. Instead, once initialized, the encrypt/block block $325_{1-2}$ may simply XOR each bit being moved to/from the particular core 305, 310 using the keystream. Thus, the functionality provided by the trust anchor is located adjacent to each processing core 305, 310 and secures any element shared by VMs running on different cores (in this case L3 cache 330 and memory 340). In one embodiment, the key generation components $320_{1-2}$ may be configured to use a VM key, a memory address and a nonce to generate a keystream used by the encryption/decryption blocks $325_{1-2}$.

The memory controller 335 may be configured to move data between memory 340 and the L3 cache. For example, the memory controller 335 may select to flush data from the L3 cache 330 to the memory 340. In one embodiment, when doing so, the memory controller 335 also writes the nonce value used to encrypt the data when it was written to the L3 cache 330 to memory 340. Similarly, the memory controller 335 may retrieve the appropriate nonce value when reading encrypted data from the memory 340.

FIG. 4 further illustrates aspects of the processor architecture first shown in FIG. 3, according to certain embodiments of the present disclosure. In particular, FIG. 4 shows the processor architecture of FIG. 3 used to perform a secure write operation 401 to an L3 cache 433 and used to perform a secure read operation 402 from the L3 cache 433.

As shown, the write operation 401 encrypts plaintext data $405_1$ as it is moved from an L2 cache local to a processing core to an L3 cache 433 shared by multiple processing cores. Illustratively, an encrypt/decrypt block $410_1$ includes a key $415_1$, an AES engine $420_1$, a memory address $425_1$ and a nonce $430_1$. The key $415_1$ is provided to the encrypt/decrypt block $410_1$ by the trust anchor. As noted above, the key $415_1$ corresponds to a VM (or hypervisor) being executed on one of the processing cores of a multi-core CPU (e.g., the processor architecture shown in FIG. 3). The memory address $425_1$ corresponds to a memory address of the plaintext $405_1$ being written from an L2 cache to the shared L3 cache 433. The nonce $430_1$ provides a one-time value used for a given write operation. Typically, the nonce $430_1$ may be a counter value incremented for each write (and read) to the shared L3 cache 433. Alternatively, however, the nonce $430_1$ may be generated from a random or pseudo-random noise source.

In one embodiment, the AES engine 420 provides a hardware implementation of the AES-CTR stream cipher and is configured to generate a keystream from the key material, i.e., from the key $415_1$, the memory address $425_1$, and the nonce $430_1$. The resulting keystream is XORed with the plaintext $405_1$ as it is pushed from the L2 cache on a processing core to the shared L3 cache 433, resulting in ciphertext $435_1$. In addition to writing the resulting encrypted data to the L3 cache 433, the nonce value in the encrypt/decrypt block $410_1$ is also written to the L3 cache 433 (shown in FIG. 4 as nonce $440_1$). More generally, the encrypt/decrypt block may apply any keyed pseudorandom function to the counter, in order to generate a keystream XORed with the plaintext $405_1$.

In one embodiment, the encrypt/decrypt block $410_1$ may include a separate cache line to the L3 cache 433 allowing the nonce $430_1$ to be stored in the L3 cache 433 (as nonce $440_1$) in parallel with the plaintext $405_1$ being enciphered using the keystream and stored in the L3 cache 433 as ciphertext $435_1$. Alternatively, the nonce $340_1$ may written to the cache 433 using the same cache line used to write the ciphertext $435_1$.

The read operation 402 is similar to the write operation 401, but in the reverse direction. To read enciphered data $435_2$ from the L3 cache 433, the memory address $425_2$ and the nonce $440_2$ are read into the encrypt/decrypt block $410_2$. Again, the key $415_2$ is the session key associated with a VM (or hypervisor) being executed on a processing core of a multi-core processor—and remains unchanged between context switches on the processing core. The memory address $425_2$ corresponds to the memory address of the data being pulled into the L2 cache and the nonce $430_2$ is the nonce value used to encipher the data when it was written to the L3 cache 433. That is, the same key material used by the write operation 401 to generate a keystream used to encrypt the plaintext $405_1$ is used to re-generate the same keystream to decrypt the encrypted data $435_2$ from the L3 cache 433. Accordingly, in one embodiment, AES-CTR is used to generate the keystream from the key material for the read operation 402. Of course, other keyed pseudorandom functions may be used. The resulting keystream is then XORed with the encrypted data $435_2$ from the L3 cache 433 and written as plaintext $405_2$ in the L2 cache.

Figure 5:
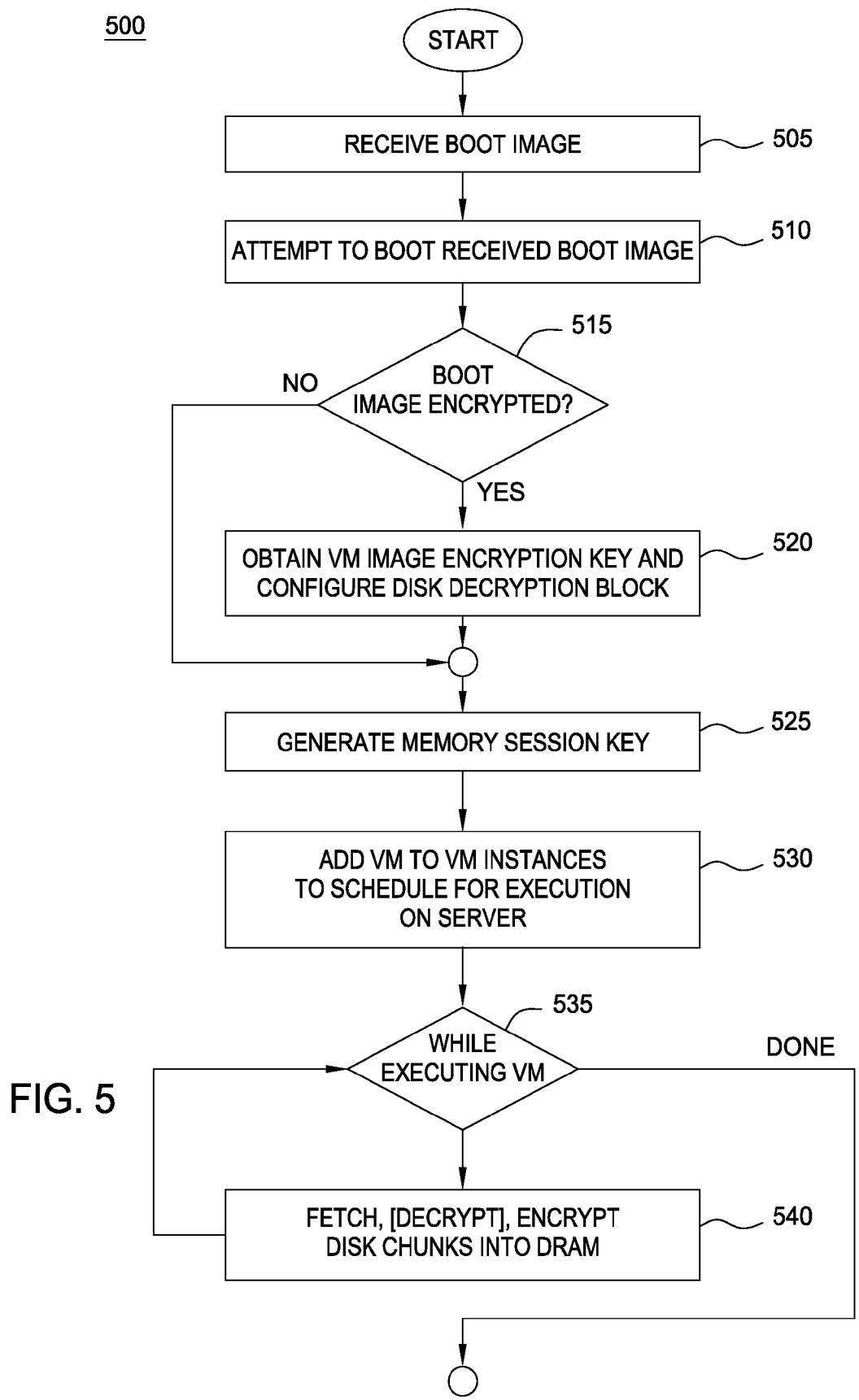
FIG. 5 illustrates a method for securely booting a VM instance, according to certain embodiments of the present disclosure.

FIG. 5 illustrates a method 500 for securely booting a VM instance, according to certain embodiments of the present disclosure. As shown, the method 500 begins at step 505 where a hypervisor receives a boot image of a virtual machine to boot and execute on a virtualization server. For example, in one embodiment, a user may transmit a VM boot image to a cloud provider along with a set of requirements for the virtualized hardware system on which to execute the VM instance (e.g., a processor speed, memory requirements, etc.). The VM boot image may be encrypted using a VM image encryption key generated by the user. In one embodiment, each 4 kb chunk is encrypted independently so that chunks may be decrypted and paged in and out of memory on the virtualization server without decrypting the whole image At step 510, the hypervisor attempts to boot the VM boot image. At step 515, the hypervisor determines whether the VM boot image is encrypted. If so, the hypervisor triggers a negotiation between the trust anchor and the user that submitted the VM boot image for execution (or an associated key service) to obtain the VM image encryption key used to encrypt the VM boot image. Once obtained, the trust anchor configures a disk control block with that key (step 520). The VM image encryption key is used to decrypt memory pages of the encrypted VM boot image as they are fetched from storage and stored in memory (or encrypt pages flushed from memory to storage). The trust anchor stores the VM image encryption key associated with the VM image in a secure key store. At step 525, the trust anchor also generates a memory session key used to configure an encrypt/decrypt block in cache lines between an L3 cache and memory and between the L3 cache and an L2 cache on each processing core. Once keys encrypt/decrypt blocks on the CPU are configured, the VM image may be fetched from storage and booted. The hypervisor may them boot the VM image and schedule it for execution (step 530).

At step 535, the hypervisor executes the VM image on one of the processing cores. As portions of the encrypted VM image are fetched from storage, the disk control block decrypts them using the VM image encryption key (step 540). The memory session key is then used to re-encrypt such elements as they are written to an L3 cache. When data for a given memory address is needed, the memory session key in the cache line between the L2 cache of a processing core and the shared L3 caches is used to decrypt data read from (and written to) the L3 cache. Thus, the data in the L3 cache (shared among multiple processing cores) remains encrypted until fetched into an L2 cache (local to a processing core).

If the VM boot image is not encrypted (step 515), then the trust anchor may still generate a memory session key in order to encrypt/decrypt all write/reads to the L3 cache made by the VM while executing on a processing core (step 525). In either case, the hypervisor may begin scheduling the VM for execution on one of the processing cores of a multi-processor CPU (step 530). Additionally, when the hypervisor initiates a context switch, the trust anchor configures the encrypt/decrypt blocks on the CPU with the appropriate VM image encryption key and memory session key for an incoming VM.

Figure 6:
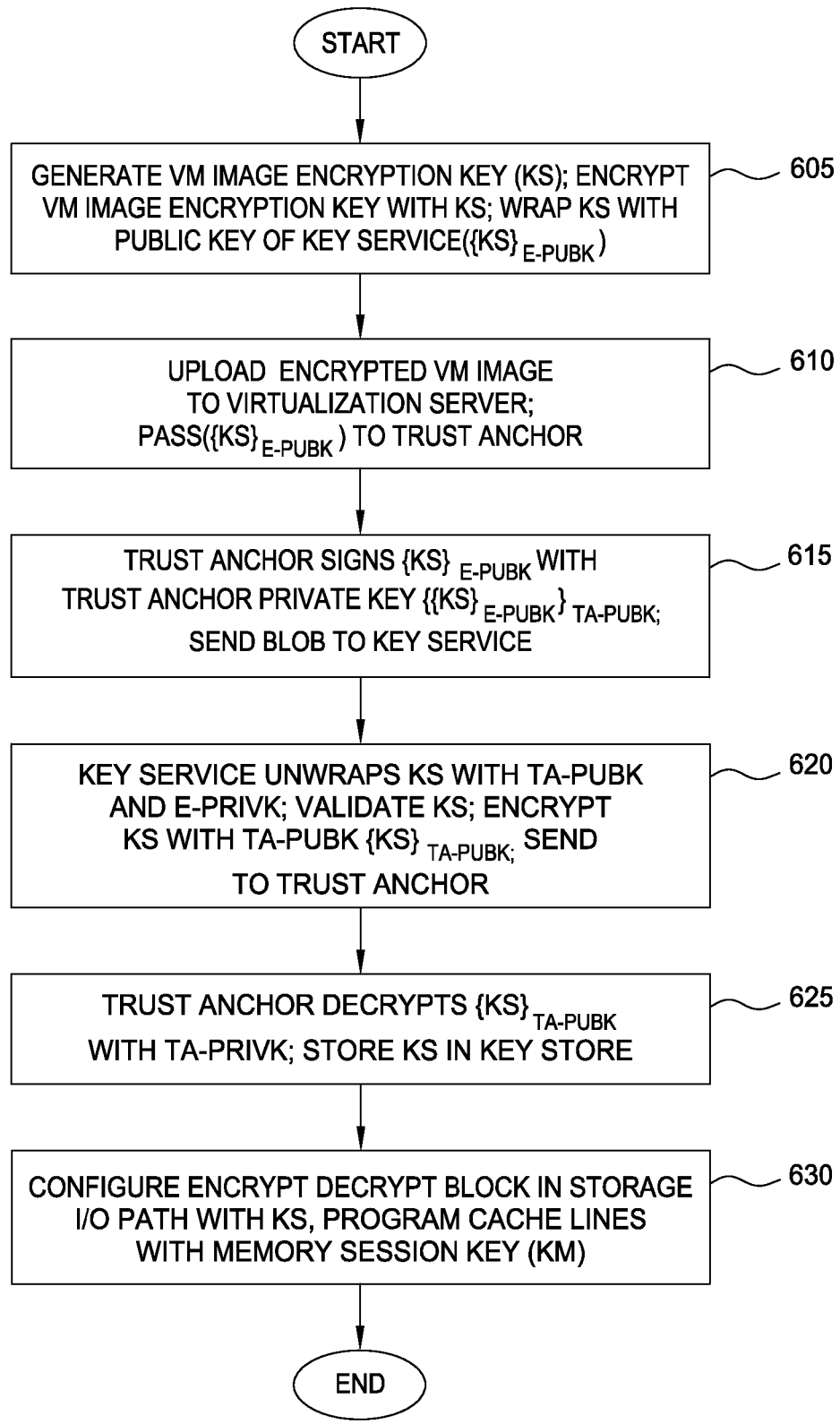
FIG. 6 illustrates a method for secure virtual machine bootstrap in untrusted cloud infrastructures, according to certain embodiments of the present disclosure.

FIG. 6 illustrates a method 600 for secure virtual machine bootstrap in untrusted cloud infrastructures, according to certain embodiments of the present disclosure. Elements of the method 600 are described in conjunction with FIGS. 8A-8C, which depict an example processor architecture which may be used to securely boot a virtual machine in an untrusted cloud infrastructure, according to certain embodiments of the present disclosure.

As shown, the method 600 begins at step 605 where a user generates a VM image encryption key (KS) and uses it to encrypt a VM image. In one embodiment, the user encrypts the VM image encryption key (KS) with a public key corresponding to a key pair held by the user or enterprise (notated as E-Pub-K). Note, as used herein, an object encrypted using a given key is notated as {encrypted object}$_{Key}$. Accordingly, the VM image encrypted using the encryption key (KS) is notated as {VM Image}$_{KS}$.

In one embodiment, the IETF Cryptographic Message Syntax (CMS) defined in RFC 3852 can be used to wrap the keys. The Enveloped-data Content Type in RFC 3852 supports this key wrapping; KS is called the content-encryption key. The image encryption method can use any convenient cipher, including AES-CBC (cipher block chaining), AES-GCM (Galois counter mode), or a storage-friendly mode such as AES-XCB (extended codebook). Additionally, the encryption method selected to encrypt the VM image may be non-malleable; this means that an attacker cannot alter the ciphertext in such a way as to cause the post-decryption plaintext to be any particular value. Instead, the post-decryption ciphertext appears random. Doing so ensures that an attacker who is able to alter the ciphertext still cannot manipulate the value of the post-decryption plaintext. AES-XCB is a nonmalleable cipher suitable for VM image encryption.

In one embodiment, the key service may also sign the VM. And the enterprise may also sign the VM image before sending it to the virtualization server. That is, in addition the trust anchor authenticating itself to the enterprise, the enterprise may authenticate itself to the trust anchor.

At step 610, the enterprise uploads the encrypted VM image and the encrypted session key to the virtualization server. That is, the enterprise uploads {VM Image}$_{KS}$ and {KS}$_{E-PubK}$ to the virtualization server. Once received, the hypervisor passes the VM image encryption key (KS) (i.e., {KS}$_{E-Pub-K}$) to the trust anchor on a multi-core CPU.

Figure 8A:
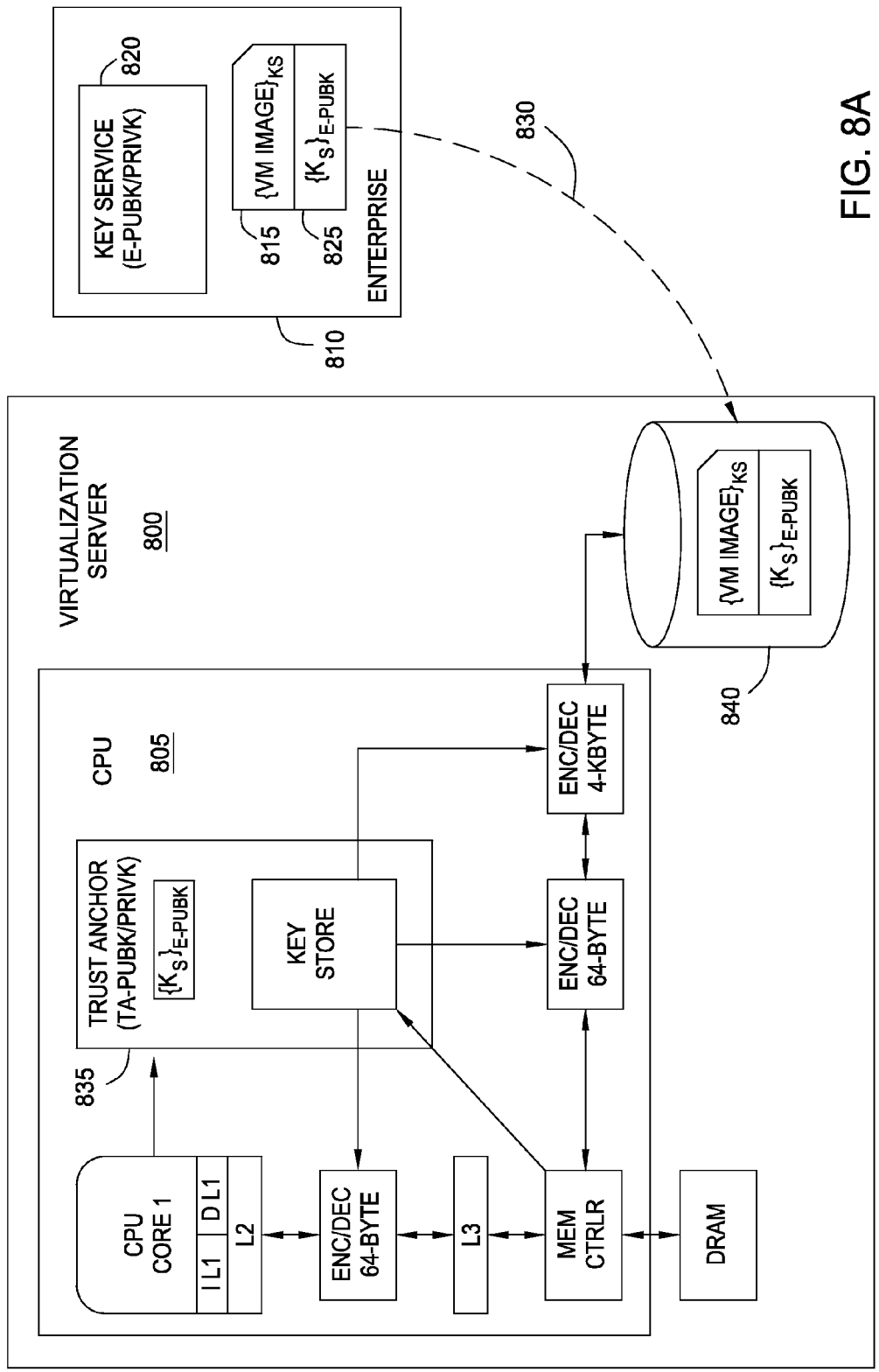
FIGS. 8A-8E depict an example of a processor architecture being used to securely boot a virtual machine in an untrusted cloud infrastructure using the methods of FIG. 6 and FIG. 7, according to certain embodiments of the present disclosure.

For example, FIG. 8A illustrates an enterprise 810 with an encrypted VM image 815, a key service 820 and an encrypted session key {KS}$_{E-Pub-K}$ 825. The enterprise 810 generally represent any user or organization that desires to boot and execute a VM image in an untrusted cloud infrastructure in a secure manner according to any of the embodiments presented herein. The key service 820 provides the public/private key pair used by the enterprise. Note, although shown as part of the enterprise 810, the key service 820 could be provided by a trusted third party external to the enterprise 810, e.g., by a certificate authority used to sign the public key (E-PubK) named in a PKI certificate issued by the certificate authority.

Figure 8B:
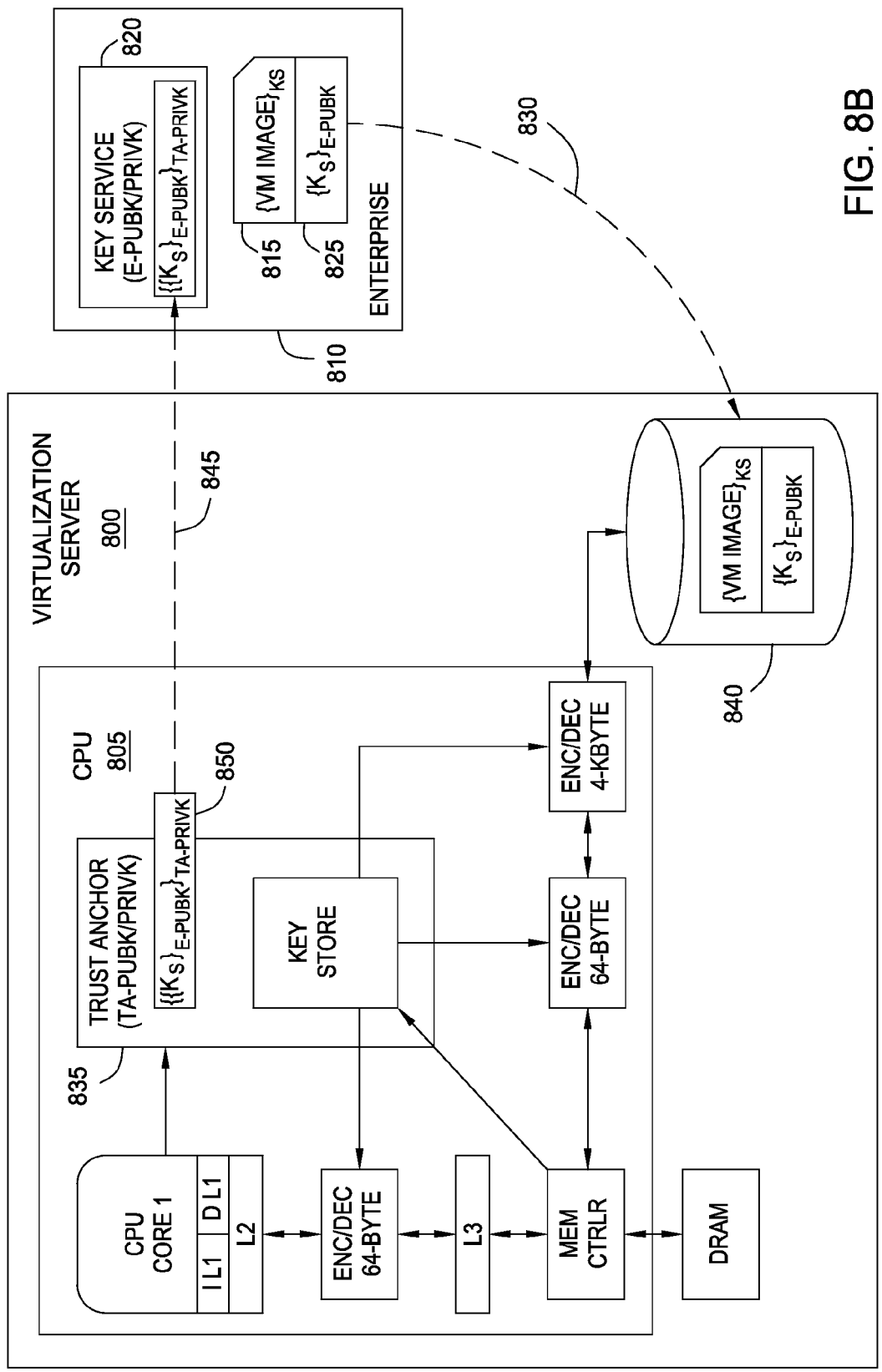

Illustratively, an arrow 830 represents the encrypted VM image 815 (i.e., {VM Image}$_{KS}$) and VM image encryption key 825 (i.e., {KS}$_{E-PubK}$) being uploaded to a storage repository 840 on the virtualization server 800. Once received by the virtualization server 800, the {KS}$_{E-Pub-K}$ is passed to a trust anchor 835 on the CPU 805. In one embodiment, the trust anchor 835 triggers a process to authenticate itself to the enterprise in order to obtain a clear-text copy of the VM image encryption key (i.e., to obtain KS). Returning to the method 600, at step 615, the trust anchor signs {KS}$_{E-PubK}$ using the private key embedded in the trust anchor. Doing so results in {{KS}$_{E-PubK}$}$_{TA-PrivK}$. The resulting encrypted data is sent back to the user or enterprise for authentication. For example, as shown in FIG. 8B shows, an arrow 845 represents {{KS} E-PubK}TA-PrivK 850 being sent back to the key service 820.

At step 620, they keys service unwraps the VM image encryption key (KS) with the public key of the trust anchor (i.e., with TA-PubK) and the enterprise private key (i.e., with E-Priv-K). The resulting clear text copy of KS is compared with the original version of KS send to the trust anchor. If the copy of KS received from the trust anchor (following the decryption operations) matches the version of KS sent to the trust anchor, then the virtualization server is deemed as being authenticated, i.e., is, as being a virtualization server having a multi-core CPU configured with a trust anchor configured according to an embodiment described herein. Once authenticated, the key service then encrypts KS with the public key of the trust anchor (i.e., with TA-PubK) and transmits it back to the virtualization server.

At step 625, the trust anchor receives the copy of KS encrypted with the public key of the trust anchor, i.e., the trust anchor receives {KS}$_{TA-PubK}$. Once received, the trust anchor may decrypt {KS}$_{TA-PubK}$ using the private key embedded on the trust anchor. Thus, once the trust anchor is authenticated, the enterprise then sends an encrypted copy of the VM image encryption key (KS), which the trust anchor can decrypt. The trust anchor may stores the clear text copy of KS in a private key store. Additionally, the trust anchor may generate a memory session key (KM) and store it in the private key store. At step 630, the trust anchor configures the multi-core CPU to boot the encrypted VM image. For example, the trust anchor may configure an encrypt/decrypt block between a storage repository and memory with the VM image encryption key (KS) and configure the encrypt/decrypt blocks in the cache lines between the memory and L3 cache with the memory session key (KM).

Figure 8C:
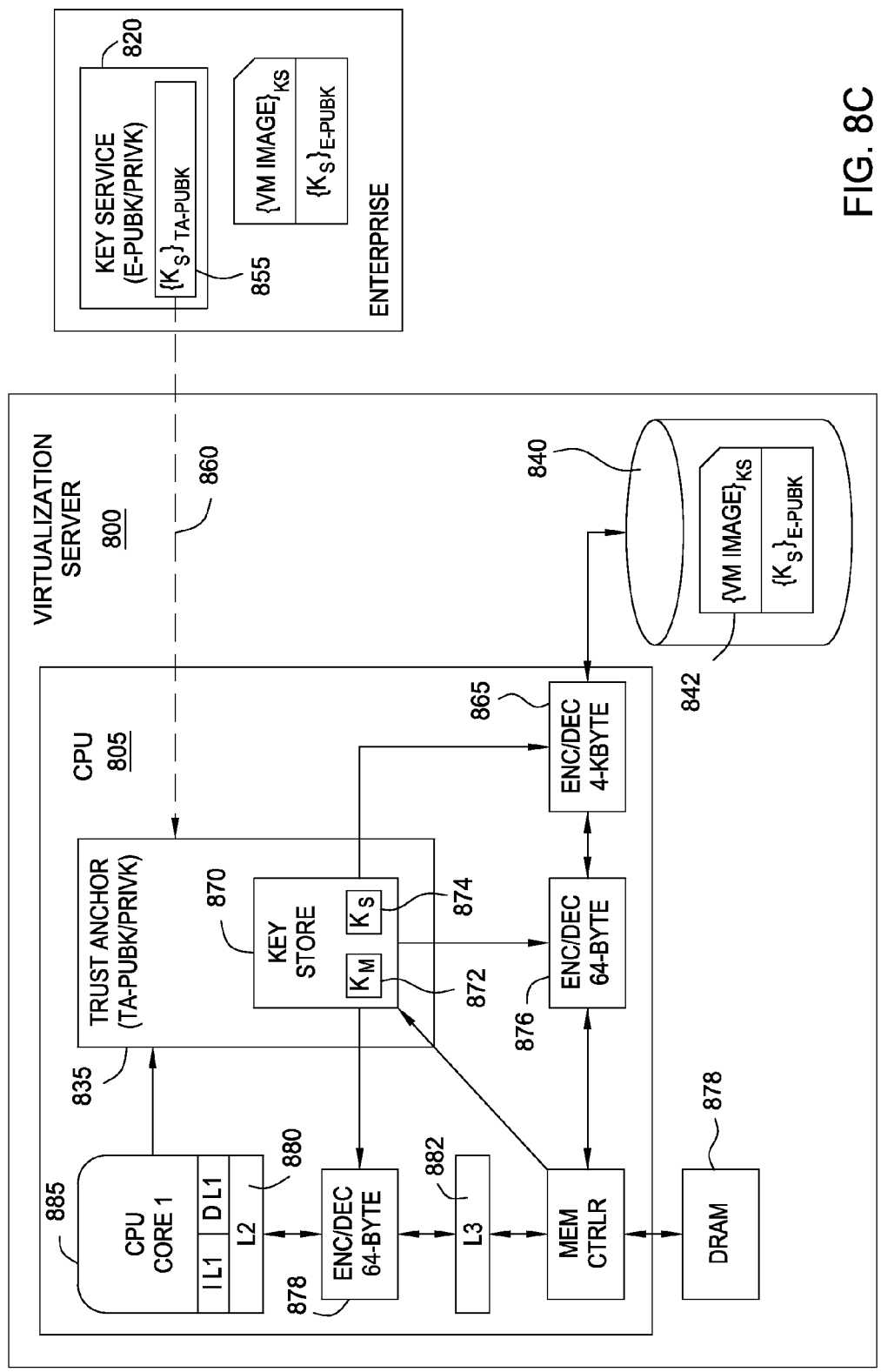

FIG. 8C illustrates an example of steps 620, 625 and 630. As shown, the key service 820 encrypts the VM image encryption key (KS) using the public key of the trust anchor, resulting in {KS}$_{TA-PubK}$ 855. An arrow 860 represents {KS}$_{TA-Pubk}$ 855 being transmitted to the trust anchor 835. As described, decrypting {KS}$_{TA-PubK}$ provides the trust anchor 835 with an unencrypted copy of the VM image encryption key (KS) 872, which is then stored in a key store 870. Further, the trust anchor also generates a memory session key (KM) 872, also stored in key store 870.

To allow the hypervisor to boot the encrypted VM image 842 in storage repository 840, the trust anchor 835 configures an encrypt/decrypt block 865 with the VM image encryption key (KS) 874. In the example architecture of CPU 805, encrypt/decrypt block 865 provides an encryption/decryption engine configured to operation on 4-Kbyte chunks of the encrypted VM image 842. More generally, the encrypt/decrypt block 865 encrypts data as it is written to disk and decrypts data as it is read from disk (i.e., from storage repository 840). The encrypt/decrypt block 865 can also use a different AES mode of operation than the cache encrypt/decrypt blocks 876 and 878, such as AES-XBC, which is less prone to cut and paste attacks. Of course, other ciphers may be used as well. Importantly, as the enterprise 810 provides the VM image encryption key (KS) to the virtualization server 800, data written to a storage repository is encrypted using a key held by the enterprise 810.

Encrypt/decrypt block 876 provides an encryption/decryption engine used to encrypt/decrypt data that is written to and read from DRAM 878. Encrypt/decrypt block 876 may be configured to work on 64-byte cache lines, like the encrypt/decrypt block 878 (including the nonce management) as discussed above relative to FIGS. 3 and 4. Accordingly, encrypt/decrypt blocks 876 and 878 may operate using AES-CTR mode to generate a keystream using memory addresses and nonce values in order to encrypt/decrypt data between the L2 cache 880 and the L3 cache 882 (for block 878) and between the DRAM 878 and the L3 cache 328 (for block 876).

In one embodiment, encrypt/decrypt blocks 865 and 876 operate at I/O speeds (~6 Gbps), rather than at the cache speed of encrypt/decrypt block 878, and a gate-efficient implementation can be chosen. This architecture separates keys that are used for disk encryption (i.e., KS 874) from keys used for cache encryption (i.e., KM 872). Doing so ensures that the memory session key (KM) 872 never leaves CPU boundaries or direct control of the trust anchor 835.

Figure 7:
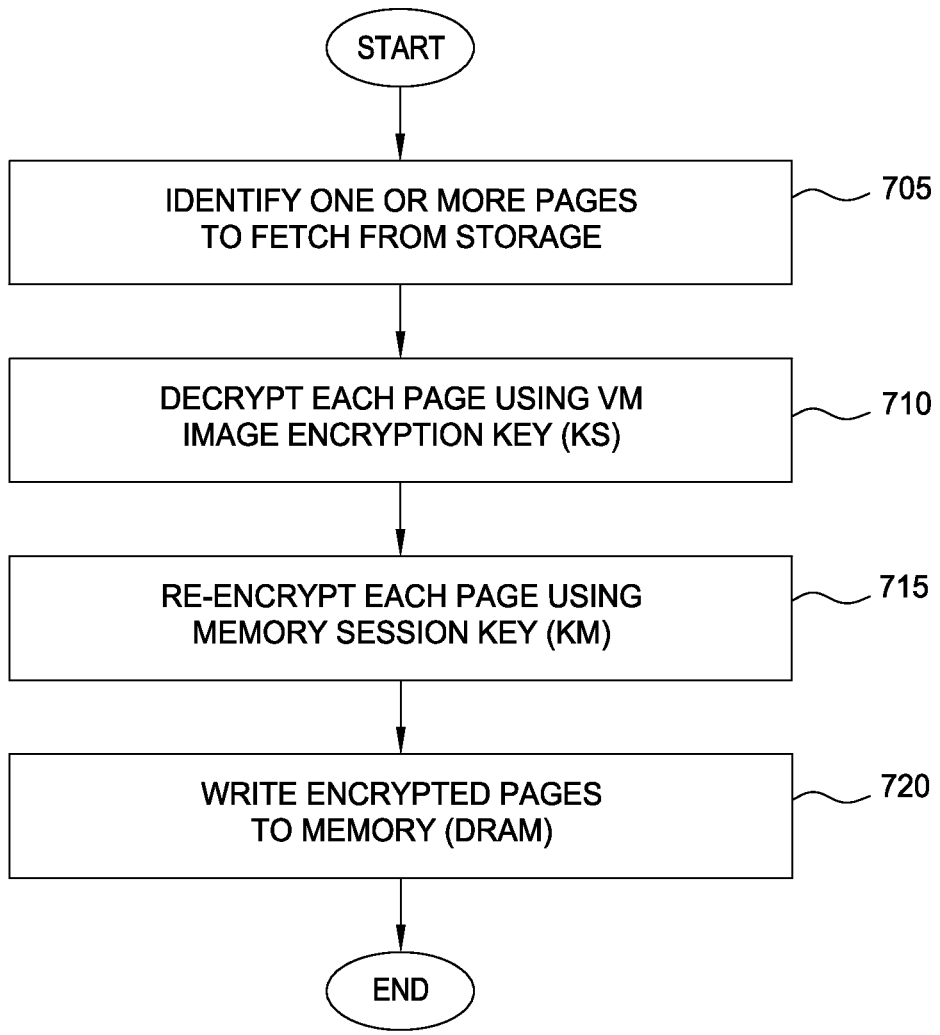
FIG. 7 illustrates a method for fetching portions of an encrypted VM image from storage, according to certain embodiments of the present disclosure.

I/O starts by reading an n-KB chunk of the encrypted VM image 842 from the storage repository 840. The read in chunk is decrypted with KS and re-encrypted with KM while being written to DRAM 848. Once data for a given cache line of the L3 cache 882 is copied to the L2 cache 880, it will be decrypted and available for bootstrapping the VM image, i.e., clear text instructions and data in the L2 cache 880 are available for the L1 instruction and data caches on processing core 885. For example, FIG. 7 illustrates a method 700 for fetching portions of an encrypted VM image from storage, according to certain embodiments of the present disclosure.

As shown, the method 700 begins at step 705 where one or more pages to fetch from storage are identified. As a memory controller directs the pages in being written to DRAM, a first encrypt/decrypt block configured by the trust anchor with the VM image encryption key (KS) decrypts the pages as they are fetched from storage (step 710). The output of the first encrypt/decrypt block may be passed to a second encrypt/ decrypt block, where the trust anchor has configured the second encrypt/decrypt block with the memory session key (KM). The second encrypt/decrypt block encrypts the pages using the memory session key (KM) as they are being written to memory (step 715 and 720).

Figure 8D:
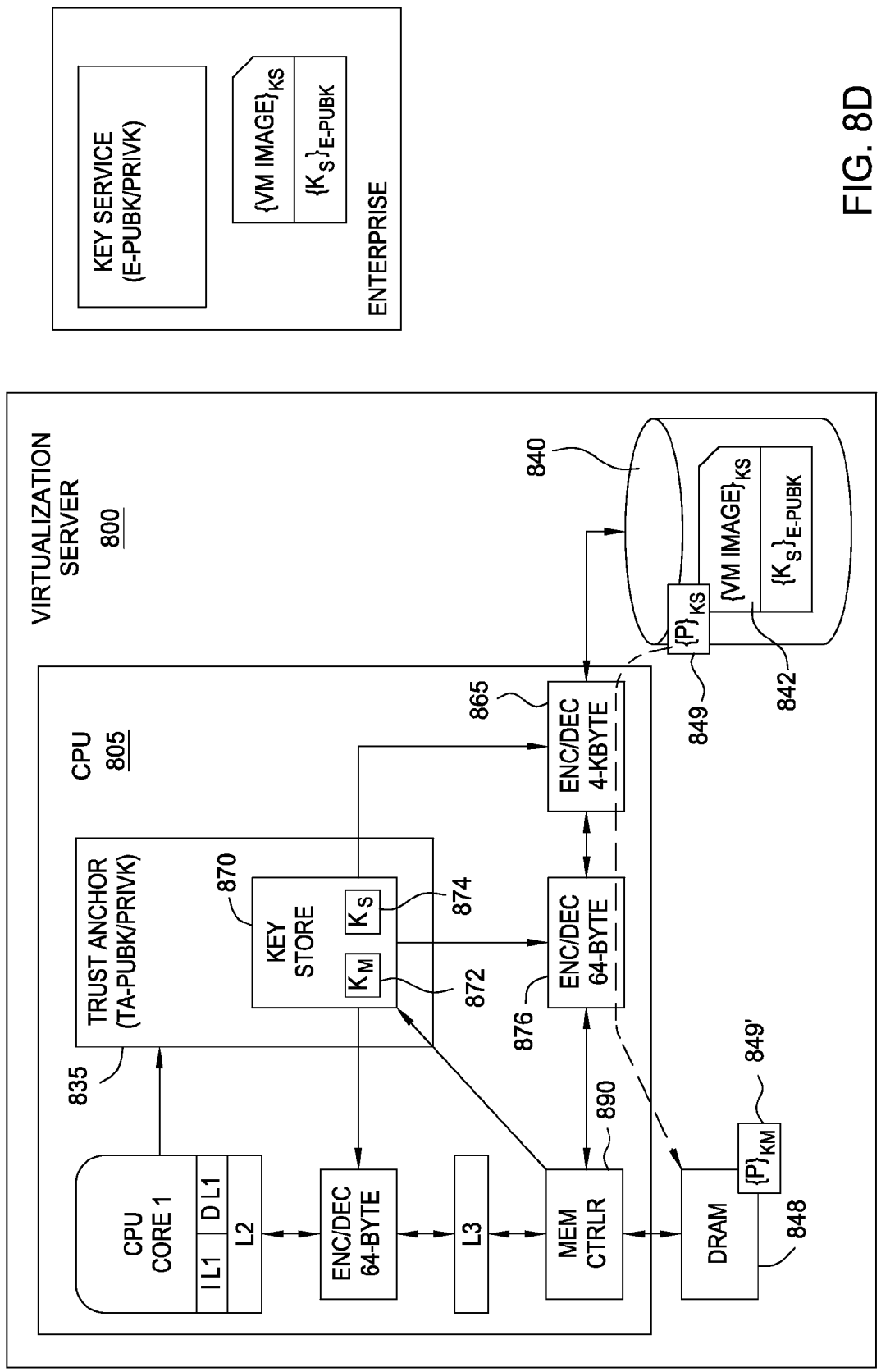
Figure 8E:
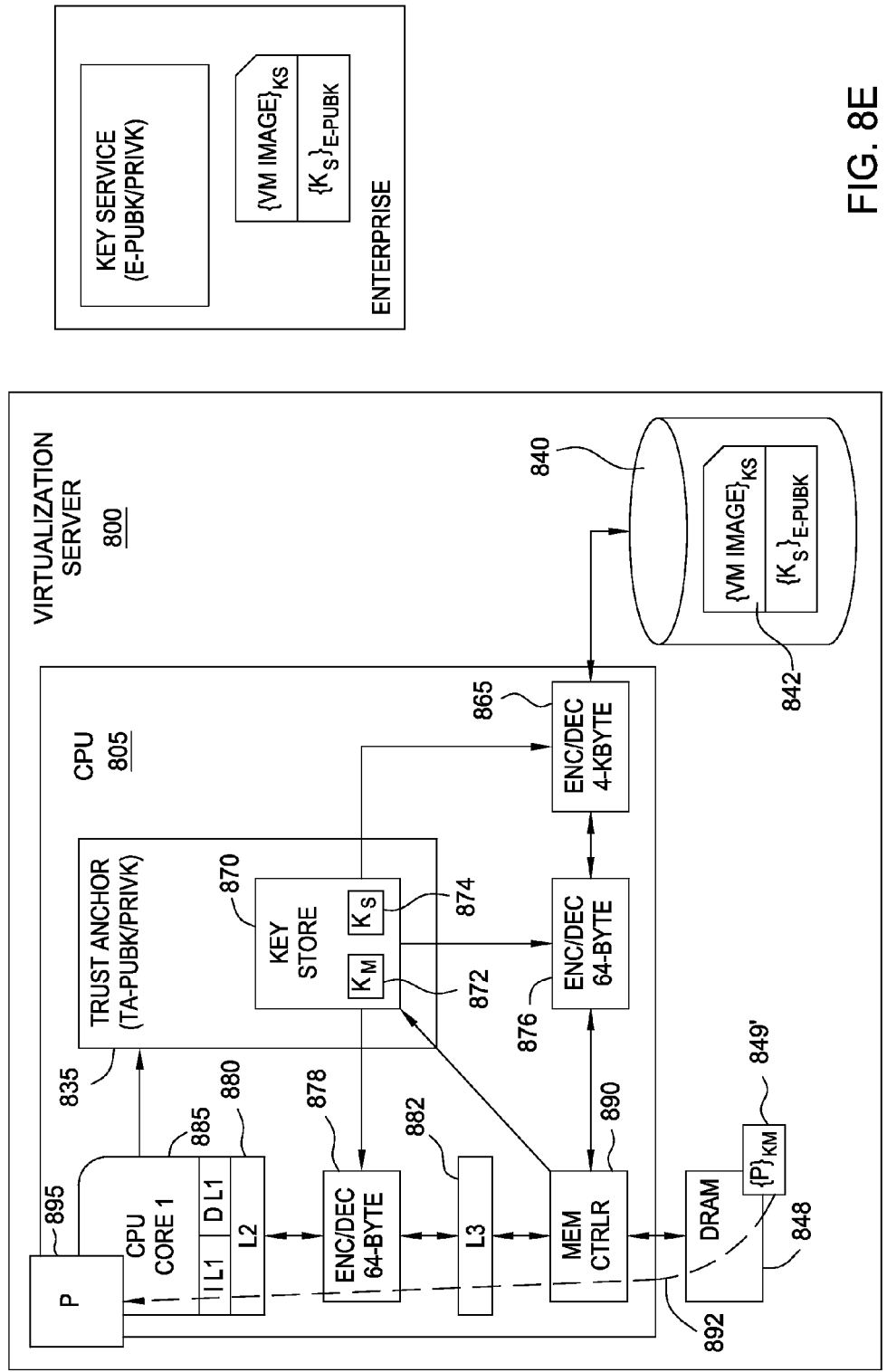

For example, FIG. 8D shows an encrypted page $\{P\}_{KS}$ 849 of the VM image 842 being written to DRAM 848 on the virtualization server 800. An arrow 885 represents the encrypted page $\{P\}_{KS}$ 849 being passed to the encrypt/decrypt blocks 865 and 876 as this page is being written to DRAM 848. The encrypt/decrypt block 865 decrypts $\{P\}_{KS}$ using KS 872. Subsequently, encrypt/decrypt block 876 encrypts P using KM, resulting in $\{P\}_{KM}$ 849' being written to dram 848. Once in DRAM 848, the memory controller 890 can pull the page P into the L3 cache shared by the processing cores on CPU 805 of virtualization server 800. For example, FIG. 8E shows the encrypted page $\{P\}_{KM}$ 849' being written to L3 cache 882 on the CPU 805 virtualization server 800. As shown, an arrow 899 represents the encrypted page $\{P\}_{KM}$ 849' being written to the L3 cache 882 and decrypted using the encrypt/decrypt block 878 as it is being written to the L2 cache 880 (e.g., using the approach described above relative to FIGS. 3 and 4). Encrypt/decrypt block 878 decrypts $\{P\}_{KM}$ 849', and writes decrypted page P 895 to the L2 cache 880 on processing core 885.

Thus, the only entity in the architecture of CPU 805 that has access to the unencrypted pages of the VM image 842 is the L2 cache 880 and processing core 885 on which VM image 842 is executed. Further, the memory session key (KM) 872 never leaves the boundary of the CPU 805, and is only used to configure the encrypt/decrypt block 878 by the trust anchor 835 when the CPU signals the trust anchor 835 that VM image 842 is to be executed on processing core 885. Further, although shown in terms of reading page P 895 from storage 840, one of ordinary skill in the art will ready recognize that the process functions in a similar manner when writing data to the L3 cache back to DRAM 848 and storage 840. As encrypted data is flushed from the L3 cache 882, the data is first passed to the encrypt/decrypt block 876, which decrypts the data using the memory session key KM. Then, the data is passed to encrypt/decrypt block 865, which encrypts the page data using the VM image encryption key (KS) as it is written to storage 840.

In sum, embodiments described herein provide techniques for securely booting and executing a virtual machine (VM) image in an untrusted cloud infrastructure. For example, one embodiment described herein provides a computing architecture which includes a multi-core processor configured with additional hardware components—referred to as a trust anchor. As described, the trust anchor may be provisioned with a private/public key pair allows the multi-core CPU to authenticate itself as being able to securely boot and execute a virtual machine (VM) image in an untrusted cloud infrastructure.

For example, prior to booting an encrypted VM image, the trust anchor engages in a security protocol to authenticate itself to the enterprise and obtain a VM image encryption key used to decrypt the encrypted VM image. As described above, the trust anchor configures a disk control block with the VM image encryption key. The trust anchor also generates a memory session key used to configure an encrypt/decrypt block in each cache line between an L3 cache and memory and between the L3 cache and an L2 cache on each processing core. Once the encrypt/decrypt blocks on the CPU are configured with the keys, the VM image may be fetched from storage and booted.

As elements of the encrypted VM image are fetched from storage, the disk control block decrypts them using the VM image encryption key. The memory session key is then used to re-encrypt such elements as they are written to an L3 cache. When data for a given memory address is needed, the memory session key in the cache line between the L2 cache of a processing core and the shared L3 caches is used to decrypt data read from (and written to) the L3 cache. Thus, the data in the L3 cache (shared among multiple processing cores) remains encrypted until fetched into an L2 cache (local to a processing core).

While the foregoing is directed to embodiments of the present disclosure, other and further embodiments of the disclosure may be devised without departing from the basic scope thereof, and the scope thereof is determined by the claims that follow.

We claim:

1. A method, comprising:
   receiving, by a trust anchor on a central processing unit (CPU) having a plurality of processing cores, a virtual machine (VM) image, wherein the VM image is encrypted using a VM image encryption key;
   obtaining the VM image encryption key;
   configuring a first encrypt/decrypt block with the VM image encryption key;
   generating a memory session key;
   configuring a second encrypt/decrypt block with the memory session key;
   fetching one or more pages of the VM image into a memory accessible by the plurality of processing cores, wherein each fetched page is decrypted by the first encrypt/decrypt block using the VM image encryption key and subsequently encrypted by the second encrypt/decrypt block using the memory session key;
   configuring a third encrypt/decrypt block with the memory session key, wherein the third encrypt/decrypt block is present between a first cache and a second cache on the CPU, and wherein the first cache is local to one of the processing cores on the CPU and the second cache shared by the plurality of processing cores on the CPU;
   identifying a memory address associated with data to be read from the second cache into the first cache;
   generating a keystream using at least the memory session key, a nonce, and the memory address, and
   decrypting, using the generated keystream, the data while being read from the second cache to the first cache.

2. The method of claim 1, wherein obtaining the VM image encryption key comprises:
   signing a first encrypted copy of the VM image encryption key with a private key embedded in the trust anchor;
   transmitting the signed, encrypted, copy of the VM image encryption key to a key service in order to authenticate the presence of the trust anchor on the CPU; and
   receiving, in response to the authentication, a second encrypted copy of the VM image encryption key, wherein the second encrypted copy of the VM image encryption key is encrypted using a public key of the trust anchor.

3. The method of claim 2, wherein the first encrypted copy of the VM image encryption key is encrypted using a public key associated with the key service.

4. The method of claim 1, wherein the pages are fetched from a disk storage repository and wherein the first encrypt/decrypt block and the second encrypt/decrypt block are disposed in an I/O path between the disk storage repository and the memory accessible by the plurality of processing cores.

5. The method of claim 1, further comprising:
writing, from the memory, the data associated with the memory address into the second cache; and
writing, from the memory, the nonce associated with the memory address into the second cache.

6. The method of claim 1, wherein the one or more pages of the VM image are fetched into the memory by a hypervisor executing on one of the processing cores in order to boot the VM image.

7. A computing system, comprising:
a CPU having a plurality of processing cores;
a memory accessible by the plurality of processing cores;
a trust anchor, wherein the trust anchor is configured to:
obtain a VM image encryption key,
configure a first encrypt/decrypt block with the VM image encryption key;
generate a memory session key,
configure a second encrypt/decrypt block with the memory session key, and configure a third encrypt/decrypt block with the memory session key, wherein the third encrypt/decrypt block is present between a first cache and a second cache on the CPU, and wherein the first cache is local to one of the processing cores on the CPU and the second cache shared by the plurality of processing cores on the CPU; and
a memory controller, wherein the memory controller is configured to:
fetch one or more pages of the VM image into the memory, wherein each fetched page is decrypted by the first encrypt/decrypt block using the VM image encryption key and subsequently encrypted by the second encrypt/decrypt block using the memory session key while being written to the memory;
identify a memory address associated with data to be read from the second cache into the first cache;
generate a keystream using at least the memory session key, a nonce, and the memory address; and
decrypt, using the generated keystream, the data while being read from the second cache to the first cache.

8. The computing system of claim 7, wherein the trust anchor is configured to obtain the VM image encryption key by:
signing a first encrypted copy of the VM image encryption key with a private key embedded in the trust anchor;
transmitting the signed, encrypted, copy of the VM image encryption key to a key service in order to authenticate the presence of the trust anchor on the CPU; and
receiving, in response to the authentication, a second encrypted copy of the VM image encryption key, wherein the second encrypted copy of the VM image encryption key is encrypted using a public key of the trust anchor.

9. The computing system of claim 8, wherein the first encrypted copy of the VM image encryption key is encrypted using a public key associated with the key service.

10. The computing system of claim 7, wherein the pages are fetched by the memory controller from a disk storage repository and wherein the first encrypt/decrypt block and the second encrypt/decrypt block are disposed in an I/O path between the disk storage repository and the memory accessible by the plurality of processing cores.

11. The computing system of claim 7, wherein the third encrypt/decrypt block is configured to:
generate a keystream using at least the memory session key, the nonce, and the memory address; and
decrypt, using the generated keystream, the data associated with the memory address while being read from the second cache to the first cache.

12. The computing system of claim 7, wherein the one or more pages of the VM image are fetched into the memory in order for a hypervisor to boot the VM image.

13. The computing system of claim 7, wherein the memory controller is further configured to:
write, from the memory, data associated with a memory address into the second cache; and
write, from the memory, a nonce associated with the memory address into the second cache.

14. A non-transitory computer-readable storage medium storing code for execution by a trust anchor on a central processing unit (CPU) having a plurality of processing cores, wherein the code, when executed by the trust anchor, performs an operation, comprising:
receiving a virtual machine (VM) image, wherein the VM image is encrypted using a VM image encryption key;
obtaining the VM image encryption key;
configuring a first encrypt/decrypt block with the VM image encryption key;
generating a memory session key;
configuring a second encrypt/decrypt block with the memory session key;
wherein one or more pages of the VM image are fetched into a memory accessible by the plurality of processing cores, and wherein each fetched page is decrypted by the first encrypt/decrypt block using the VM image encryption key and subsequently encrypted by the second encrypt/decrypt block using the memory session key while being written to the memory;
configuring a third encrypt/decrypt block with the memory session key, wherein the third encrypt/decrypt block is present between a first cache and a second cache on the CPU, and wherein the first cache is local to one of the processing cores on the CPU and the second cache shared by the plurality of processing cores on the CPU;
identifying a memory address associated with data to be read from the second cache into the first cache;
generating a keystream using at least the memory session key, a nonce, and the memory address, and
decrypting, using the generated keystream, the data while being read from the second cache to the first cache.

15. The computer-readable storage medium of claim 14, wherein the operation further comprises:
writing, from the memory, the data associated with the memory address into the second cache; and
writing, from the memory, a nonce associated with the memory address into the second cache.

16. The computer-readable storage medium of claim 14, wherein obtaining the VM image encryption key comprises:
signing a first encrypted copy of the VM image encryption key with a private key embedded in the trust anchor;
transmitting the signed, encrypted, copy of the VM image encryption key to a key service in order to authenticate the presence of the trust anchor on the CPU; and
receiving, in response to the authentication, a second encrypted copy of the VM image encryption key, wherein the second encrypted copy of the VM image encryption key is encrypted using a public key of the trust anchor.

17. The computer-readable storage medium of claim 16, wherein the first encrypted copy of the VM image encryption key is encrypted using a public key associated with the key service.

18. The computer-readable storage medium of claim 14, wherein the pages are fetched from a disk storage repository and wherein the first encrypt/decrypt block and the second encrypt/decrypt block are disposed in an I/O path between the disk storage repository and the memory accessible by the plurality of processing cores.

19. The computer-readable storage medium of claim 14, wherein the one or more pages of the VM image are fetched into the memory by a hypervisor executing on one of the processing cores in order to boot the VM image.

* * * * *